(12) United States Patent
Cardalda-Garcia et al.

(10) Patent No.: US 10,816,358 B2
(45) Date of Patent: Oct. 27, 2020

(54) METHOD AND TEST SYSTEM FOR SENSOR FUSION POSITIONING TESTING

(71) Applicant: Rohde & Schwarz GmbH & Co. KG, Munich (DE)

(72) Inventors: Adrian Cardalda-Garcia, Munich (DE); Stefan Maier, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 316 days.

(21) Appl. No.: 16/031,512

(22) Filed: Jul. 10, 2018

(65) Prior Publication Data
US 2020/0018617 A1 Jan. 16, 2020

(51) Int. Cl.
*G01C 25/00* (2006.01)
*G01C 21/28* (2006.01)
*G01C 21/16* (2006.01)
*G09B 9/00* (2006.01)

(52) U.S. Cl.
CPC ........... *G01C 25/00* (2013.01); *G01C 21/165* (2013.01); *G01C 21/28* (2013.01); *G09B 9/006* (2013.01)

(58) Field of Classification Search
USPC ......................................................... 702/116
See application file for complete search history.

(56) References Cited

U.S. PATENT DOCUMENTS

| | | | |
|---|---|---|---|
| 9,273,982 B2 | 3/2016 | Shanishchara et al. | |
| 2017/0024500 A1* | 1/2017 | Sebastian | G06F 30/20 |
| 2019/0063881 A1* | 2/2019 | Abramov | G05D 1/104 |

* cited by examiner

*Primary Examiner* — Paul D Lee
(74) *Attorney, Agent, or Firm* — Potomac Technology Law, LLC

(57) ABSTRACT

A test system for testing the positioning functionality of a device under test (DUT) is provided. The test system includes a high precision global navigation satellite system (GNSS) simulator configured to simulate real-time kinematic (RTK) signals. The test system further includes a sensor simulator configured to simulate ideal sensor signals, and a sensor error model unit. The sensor error model unit is further configured to simulate sensor errors based on a real sensor datasheet. The simulated ideal sensor signals are combined with the simulated sensor errors to form real simulation signals.

19 Claims, 3 Drawing Sheets

METHOD AND TEST SYSTEM FOR SENSOR FUSION POSITIONING TESTING

TECHNICAL FIELD

The invention relates to a test system for testing the positioning functionality of a device under test (DUT).

BACKGROUND

Accurate positioning is key to a number of technologies, from Car2Car to indoor navigation. The technologies need accurate positioning algorithms that are capable of combining input from multiple sources, including the typical Global Navigation Satellite System (GNSS) but also other sources such as sensors. The combination of sensory data or data derived from disparate sources such that the resulting information has less uncertainty that would be possible when these sources were used individually, is called sensor fusion. For example, such sensors can be accelerometers, pressure and barometric sensors, temperature sensors and gyroscopes. A combination of accelerometers and gyroscopes to measure specific force and angular rate of a body or object is called an inertial measurement unit (IMU). As some of the positioning applications are safety critical, such as Car2Car navigation, and to fulfil customer requirements, the correct functioning of the positioning algorithms must be thoroughly tested. Testing of the aforementioned sensors, especially testing of inertial measurement units (IMU's) in the laboratory, is quite challenging and costly, as it requires moving a device under test (DUT) that includes such sensors with some kind of robotic mechanisms to stimulate the sensors to generate sensor outputs.

Thus, there is a need for a method and a test system that is capable of simulating sensor outputs and of feeding the simulated sensor output data to a device under test (DUT), which can be a positioning module to be tested for its accuracy to determine its position.

The patent document U.S. Pat. No. 9,273,982B2 relates to methods and devices for configuring and running tests of hybrid positioning systems. Hybrid positioning systems are capable of receiving Global Navigation Satellite System (GNSS) data and of generating electric signals with microelectronic mechanical sensors (MEMS) incorporated into the positioning system. In challenging environments such as urban canyons, where multi-path reflections are present or in indoor environments that either receive no signal from GNSS systems or that receive only reflected, distorted and/or weak signals, the use of such microelectronic mechanical sensors provides appropriate information to determine the position of the hybrid positioning system. The cited document discloses a test system including a test interface and controller that coordinate the test signals and MEMS data sensed on the portable device. The test signals are emulated Global Navigation Satellite System (GNSS) signals, Global Positioning System (GPS) signals, WiFi signals from access-points or cellular signals from towers and so-called femtocells.

The document U.S. Pat. No. 9,273,982B2, however, does not address the emulation of MEMS data sensed on a portable device combined with high accuracy GNSS methods, and also does not address an error model that is directly based on sensor datasheets—instead, the document simply describes a generic error model, such as a Gauss-Markov noise and fixed offsets.

What is needed, therefore, is an approach for sensor fusion positioning testing using a high precision Global Navigation Satellite System (GNSS) simulator, along with a sensor simulation unit, capable of simulating sensor errors based on a real sensor data sheet to overcome the foregoing deficiencies.

SOME EXAMPLE EMBODIMENTS

Embodiments of the present invention advantageously address the foregoing requirements and needs, as well as others, by providing a test system and test method for testing the positioning functionality of a device under test (DUT), including sensor fusion positioning testing, for example, using a high precision global navigation satellite system (GNSS) simulator (e.g., capable of simulating real-time kinematic (RTK) signals) and a sensor simulation unit for simulating sensor errors based on a real sensor data sheet (e.g., capable of simulating ideal sensor signals and a sensor error model unit to add errors to the ideal sensor signals).

According to a first aspect of the invention, a test system for testing the positioning functionality of a device under test (DUT) is provided. The test system comprises a high precision global navigation satellite system (GNSS) simulator capable of simulating real-time kinematic (RTK) signals, a sensor simulator capable of simulating ideal sensor signals and further a sensor error model unit. The sensor error model unit is capable of simulating sensor errors based on a real sensor datasheet, and more precisely based on parameters and the related parameter values given for a real sensor in its datasheet, and is configured to combine the simulated ideal sensor signals with the simulated sensor errors to form real simulation signals. Real simulation signals, in the sense of this application, for example, are simulated signals which are identical to signals an actual hardware-realized sensor would be generated. The use of the wording RTK signals has the same meaning than using the wording RTK correction data. RTK signals, respectively RTK correction data that is normally generated in a real RTK system is simulated that the DUT sees a real RTK system. In a real RTK system, that enhances the accuracy of a GNSS receiver, RTK signals or RTK correction data is determined based on positioning calculations based on received satellite data and on the known position of the base station.

Advantageously, the simulation of high precision GNSS signals including RTK signals allows a very accurate testing of the positioning functionality of a DUT. RTK positioning is a satellite navigation technique used to enhance the precision of position data derived from satellite-based positioning systems (global navigation satellite systems, GNSS) such as GPS, GLONASS, Galileo, and BeiDou. It uses measurements of the phase of the signal's carrier wave in addition to the information content of the signal and relies on a single reference station or interpolated virtual station to provide real-time corrections, providing up to centimeter-level accuracy. Compared to the precision of RTK-positioning, standard GNSS techniques are only able to determine a position with an accuracy of 3 to 10 meters. Thus, to test if a positioning functionality is able to calculate positions with an accuracy within centimeters, in other words to test RTK-algorithms of the DUT, GNSS signals including RTK signals have to be simulated.

It is further advantageous to employ a sensor error model unit that is capable of simulating sensor errors based on a datasheet of a real sensor. This allows to test a DUT assuming a specific real sensor is used and to test the overall performance of the DUT with the specific sensor. Further, datasheet parameters of different sensors can be used by the sensor error model unit to determine the most suitable sensor for the hardware design. Thus, the error sensor model unit allows not just the testing of a DUT under real conditions but also the simulation of the behavior of the DUT being constructed with different sensors.

Accordingly, because ideal sensor signals are generated and the ideal sensor signals are made to real simulation signals with the sensor error model unit, the test system is able to provide ideal sensor signals and erroneous signals for further processing.

According to a first implementation form of the provided test system, the sensor simulator is capable of simulating ideal signals from a sensor such as an inertial measurement unit (IMU) and/or a barometer, odometer or magnetometer. Advantageously, the simulation of ideal signals from an IMU supports testing of a DUT, since most positioning functionalities within a DUT include a combination of accelerometers and gyroscopes to measure specific force and angular rate of a body or object. Signals generated by accelerometers are acceleration signals and signals generated by gyroscopes are turn rates. In addition to the IMU, further sensors such as barometers, odometers or magnetometers may be provided within a DUT. This advantageously facilitates the simulation of such sensors for testing a DUT.

According to a further implementation form of the provided test system, the simulated sensor errors comprise at least package to frame misalignment, inter-axis misalignment, sensitivity error, bias and noise. Advantageously, the sensor error model unit is capable of simulating sensor errors of a specific sensor based on the typical parameters given in the datasheet for that specific sensor, so to say in the real sensor datasheet. Such parameters may be package to frame misalignment, inter-axis misalignment, sensitivity error, bias and noise. Further, simulation of other errors based on various parameters specified in the datasheet of the sensor to be simulated is conceivable.

According to a further implementation form of the provided test system, the simulated ideal sensor signals and/or the real simulation signals are used by the device under test to perform positioning calculations. Advantageously, the simulated ideal sensor signals can be sent directly to the DUT for performing positioning calculations. Alternatively or additionally, the real simulation signals can be sent to the DUT for performing the positioning calculations. This allows to determine the accuracy of positioning determination assuming ideal sensors are used and to compare the results with results based on real sensors.

According to a further implementation form of the provided test system, the simulated ideal sensor signals and/or the real simulation signals are configured to simulate a specific condition that triggers a certain event to be performed by the DUT. Advantageously, the such a test system not only allows simulating sensor signals required for testing the positioning functionality of a DUT, but also allows simulating specific sensor signals that require the DUT to initiate a specific reaction based on the received simulated signals. For example, sensor signals are generated with the sensor simulator that simulate a car crash, which requires the DUT to trigger an E911 call. Further, sensor signals may be generated by the sensor simulator that simulate a turn of a car, which requires the DUT to trigger appropriate communications to other cars nearby. The verification that certain events are triggered based on specific sensor signals is advantageous, since in most cases such trigger events are safety critical and need to be tested due to regulatory requirements.

According to a further implementation form of the provided test system, the high precision GNSS simulator and/or the sensor simulator is/are adapted to receive trajectory data as input data. Further, the input data may comprise latitude, longitude, altitude, yaw, pitch and roll. Advantageously, the possibility to enter trajectory data as input data to the high precision GNSS simulator and/or the signal simulator allows a user to easily determine a desired trajectory for testing the positioning determination accuracy of a DUT.

According to a further implementation form of the provided test system, the high precision GNSS simulator is synchronized with the sensor simulator. Advantageously, the GNSS simulator is synchronized with the sensor simulator to ensure that the high precision GNSS signals and the simulated ideal sensor signals and/or the real simulation signals are synchronized in time, preferably through a time stamp. However, other known synchronization strategies can be used. Further, each of the simulators may be capable of delaying its output signals with respect to the output signals of the other simulator. For example, the GNSS simulator may delay the output of its signals to compensate for the time delay caused due to the processing time needed in the sensor signal processing unit and/or in the sensor error model unit to ensure that the high precision GNSS signal as well as the real simulation signals arrive at the same time at the DUT. Further, any desired time delay between ideal sensor signals respectively real simulation signals and the high precision GNSS signals can be realized.

According to a further implementation form of the provided test system, the simulated sensor errors further comprise temperature error and flicker noise. Advantageously, further sensor errors to simulate the behavior of actual hardware-realized sensors are given. However, any desired sensor error can be simulated with the sensor error model unit by selecting appropriate parameters that characterize the errors of the real hardware-realized sensor.

According to a further implementation form of the provided test system, the system further comprises a communication link between the test system and the device under test (DUT) to request and transmit positioning information and/or RTK correction data. The communication link may be established between the DUT and a so-called location server, which is connected to each test equipment unit, such as the GNSS simulator, the sensor simulator and which is capable of sending and receiving data from each test equipment unit, and which is further capable of sending the received data to the DUT and sending received data from the DUT to the appropriate test equipment units. Advantageously, the communication link allows the DUT to request RTK correction data from the test system, and additionally the communication link allows the test system to request positioning data from the DUT. The communication link allows any desired data exchange between the test equipment units connected to the so-called location server and the DUT. For instance, when Car2Car Communication has to be tested, especially one type of communication named V2X (Vehicle-to-everything), communication from a vehicle respectively from the DUT has to be sent to any entity that may affect the vehicle. Such communication may include position data, which can be sent over the communication link of the inventive test system to the location server and be processed and/or evaluated by the appropriate units of the test system. In another test scenario, the test system might trigger an E911 event that requires the DUT to initiate an E911 call. The call data is sent via the communication link to the location server, which can evaluate the data and further send a request signal to the DUT to request the DUT position. This scenario is just an additional example for the use of the communication link in both directions from the test system to the DUT and vice versa.

According to a further implementation form of the provided test system, the system further comprises a signal generator configured to establish a wireless local area network (WLAN) signal, Bluetooth low energy (BLE) signal, enhanced cell ID (ECID) signal or an observed time difference of arrival (OTDOA) signal that is used by the DUT to calculate its position. Advantageously, a device under test that provides the functionality to determine its position based on signals such as WLAN signals, BLE signals, ECID signals or OTDOA signals can be tested with the test system including a signal generator being capable of generating such signals.

According to a further implementation form of the provided test system, the sensor error model unit that is capable of simulating sensor errors based on a real sensor datasheet is configured to allow a user to modify one, or more, or even all parameters specified by the real sensor datasheet. Advantageously, by providing a sensor error model unit that allows the user to modify simulation parameters, the impact on the behavior of the DUT based on selected parameters and based on different values for each selected parameter can be simulated. In other words, by varying parameter values of the simulated sensor such as sensitivity error, inter-axis misalignment and so on, the influence of different sensor parameters including the parameter values on the positioning determination capability of the DUT can be evaluated. The simulation can be used to determine required tolerances of sensors to be used with the DUT. This simulation supports engineers in selecting appropriate sensors or sensor components.

According to a further implementation form of the provided test system, the system further includes a sensor signal processing unit to configure simulated ideal sensor signals and/or real simulation signals such that they are capable of simulating particular movement patterns. Advantageously, real world scenarios can be tested easily by providing sensor data that simulates for example steps of a person walking or steps of a person running or further by providing sensor data that simulates movements of an arm. Since Car2Car applications are frequently used nowadays, the generation of sensor signals that simulate for example the turn of a car to the left or to the right or that simulate a car accident gets more and more important.

According to a second aspect of the invention, a testing method for performing positioning functionality testing of a device under test (DUT) is provided. The method comprises the step of generating high precision global navigation satellite system (GNSS) signals, including real-time kinematic (RTK) signals with the aid of a high precision GNSS simulator. The method further comprises the step of simulating ideal sensor signals with the aid of a sensor simulator and the step of simulating sensor errors based on a real sensor datasheet with the aid of a sensor error model unit. The method further comprises the step of combining the simulated ideal sensor signals with the simulated sensor errors to form real simulation signals with the aid of a combining functionality within the sensor error model unit.

According to a first implementation form of the provided testing method, the method further comprises the step of performing positioning calculations by the DUT based on received high precision GNSS signals and based on received simulated ideal sensor signals and/or based on received real simulation signals.

According to a further implementation form of the provided testing method, the method further comprises the step of simulating ideal signals of an inertial measurement unit (IMU) and/or simulating ideal signals from a barometer, odometer or magnetometer.

According to a further implementation form of the provided testing method, the method further comprises the step of simulating sensor errors comprising at least package to frame misalignment, inter-axis misalignment, sensitivity error, bias, noise, and/or temperature error and/or flicker noise.

According to a further implementation form of the provided testing method, the method further comprises the step of processing simulated ideal sensor signals and/or real simulation signals to simulate particular movement patterns.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

Embodiments of the present invention are illustrated by way of example, and not by way of limitation, in the figures of the accompanying drawings, in which like reference numerals refer to similar elements, and in which.

DETAILED DESCRIPTION

A test system and test method for testing the positioning functionality of a device under test (DUT), including sensor fusion positioning testing, for example, using a high precision global navigation satellite system (GNSS) simulator (e.g., capable of simulating real-time kinematic (RTK) signals) and a sensor simulation unit for simulating sensor errors based on a real sensor data sheet (e.g., capable of simulating ideal sensor signals and a sensor error model unit to add errors to the ideal sensor signals), are described. In the following description, for the purposes of explanation, numerous specific details are set forth in order to provide a thorough understanding of the invention. It is apparent, however, that the invention may be practiced without these specific details or with an equivalent arrangement. In other instances, well-known structures and devices are shown in block diagram form in order to avoid unnecessarily obscuring the invention.

A processor, unit, module or component (as referred to herein) may be composed of software component(s), which are stored in a memory or other computer-readable storage medium, and executed by one or more processors or CPUs of the respective devices. A module or unit may alternatively be composed of hardware component(s) or firmware component(s), or a combination of hardware, firmware and/or software components. Further, with respect to the various example embodiments described herein, while certain of the functions are described as being performed by certain components or modules (or combinations thereof), such descriptions are provided as examples and are thus not intended to be limiting. Accordingly, any such functions may be envisioned as being performed by other components or modules (or combinations thereof), without departing from the spirit and general scope of the present invention. Further, the methods, processes and approaches described herein may be processor-implemented using processing circuitry that may comprise one or more microprocessors, application specific integrated circuits (ASICs), field programmable gate arrays (FPGAs), or other devices operable to be configured or programmed to implement the systems and/or methods described herein. For implementation on such devices that are operable to execute software instructions, the flow diagrams and methods described herein may be implemented in processor instructions stored in a computer-readable medium, such as executable software stored in a computer memory store.

Figure 1:
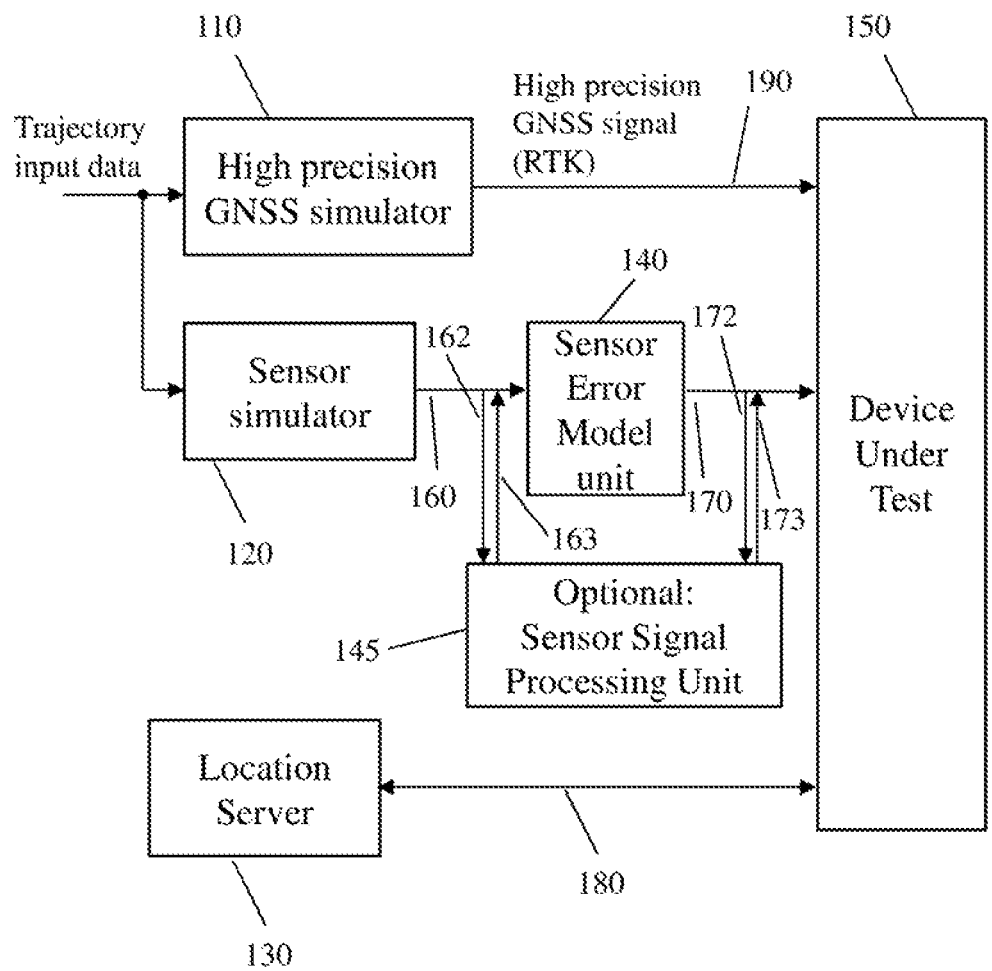
FIG. 1 shows a block diagram of a test system for testing the positioning functionality of a device under test (DUT) according to example embodiments of the present invention.

FIG. 1 shows a block diagram of a test system for testing the positioning functionality of a device under test (DUT) according to example embodiments of the present invention. The test system comprises a high precision Global Navigation Satellite System (GNSS) simulator 110, a sensor simulator 120 and a sensor error model unit 140. The test system further comprises a location server 130 and an optional sensor signal processing unit 145. The overall test system is used to test the positioning functionality of a device under test (DUT) 150. The DUT 150 may, for example, be a GNSS receiver capable of processing RTK signals, or any other mobile device including such a GNSS receiver. Testing includes the evaluation of the functioning of positioning algorithms used within the DUT.

The high precision GNSS simulator 110 is capable of simulating a complete GNSS scenario including proper simulation of the satellite orbits, the signal propagation characteristics, the characteristics of the receive antenna and the receiver environment. The simulation of the GNSS scenario has to consider external influences such a jamming and interference, the simulation has to support different classes of satellite orbits (Low Earth Orbit (LEO)/Medium Earth Orbit (MEO)/Geostationary Orbit (GEO)/Inclined Geosynchronous Orbit (IGSO)), including orbit errors and perturbations and also to provide multi-constellation and multi-frequency scenarios. The aforementioned requirements for a GNSS simulator are provided as example only, since additional parameters can be supported by a GNSS simulator.

Such GNSS simulators are commercially available depending on the measurement tasks and are able to simulate realistic GNSS scenarios. The high precision GNSS simulator 110 is further capable of simulating RTK signals, which include RTK correction data and are usually generated by an RTK system. Such RTK system typically comprises a fixed base station, which includes a GNSS receiver positioned at a known location, and further includes at least one DUT provided with a positioning functionality.

The GNSS receiver within the base station receives information content of the received satellite signal and additionally information of the phase of the signal's carrier wave from the received satellite signal. Based on the received information and the known position data of the base station, RTK correction data can be calculated. By using the calculated RTK-correction data, the mobile receiver can enhance the accuracy in determining its position. The high precision GNSS simulator is able to simulate such RTK correction data that would normally be generated by an RTK system.

The high precision GNSS simulator 110 includes at least one output that can be connected to a transmit antenna (not shown) to emit the high precision GNSS signal that includes RTK signals to a DUT 150. The high precision GNSS signal allows the GNSS receiver within the DUT 150 to more accurately determine its positioning data. The output can also be connected to a cable 190 that is further connected to the DUT 150. Alternatively, the high precision GNSS simulator 110 can provide two outputs, one output for the GNSS signals and one output for the RTK signals respectively the RTK correction data. The data from each output can be transmitted to the DUT 150 wirelessly or alternatively via a cable connection.

The sensor simulator 120 is capable of simulating ideal simulation signals. Ideal simulation signals, are signals of an ideal hardware-realized sensor, which may be sensor having an ideal transfer function. The ideal sensor generates at its output ideal signals when it is activated by a movement or other stimuli. The sensor simulator 120 simulates sensors that are typically used within a DUT 150 having a positioning functionality. Such sensors, for example, may be accelerometer sensors for measuring their acceleration, gyroscope sensors for measuring orientation and angular velocity, barometer sensors that are capable of measuring the air pressure, odometer sensors used to determine a travelled distance and/or magnetometer sensors capable of measuring magnetism.

The simulated ideal signals 160 can be directly sent to an input of a sensor error model unit 140 that is capable of transforming the ideal input signals based on simulated sensor errors based on a real sensor datasheet to signals that include errors a real sensor would have. The erroneous simulation signals, namely real simulation signals 170, are provided at the output of the sensor error model unit 140 via a standardized output interface. The sensor error model unit 140 may further include a functionality that allows the user to modify one or more parameters to simulate different sensor behaviors. The wording "standardized output interface" within this application means that the output data is coded according to a defined scheme known to the user and that allows any user to easily access the data since the coding scheme is known. Further, the standardized output interface may be capable of providing the generated sensor data according to the LTE Positioning Protocol (LPP). This is advantageous, since 3GPP in Rel-15 includes the possibility to receive and transmit sensor data using the LTE Positioning Protocol.

Further, the simulated ideal signals 160 may be sent directly to the DUT 150 without adding errors to the simulated ideal signals. By providing the option to send simulated ideal sensor signals and/or erroneous simulated signals respectively the real simulation signals to the DUT 150, the test system supports the user to compare the positioning functionality of a DUT 150 and the triggering on events functionality of the DUT 150 for ideal signals and real simulation signals. Advantageously, simulating the behavior of real sensors based on a real sensor datasheet allows the user to simulate exactly the sensors that shall be used within the DUT 150 in the hardware-realization. Further, the possibility to change one or more sensor parameters within the sensor error unit allows the user to evaluate the influence of different sensor errors on the position determination functionality of the DUT and supports the user to select appropriate sensors or sensor components to be used within the DUT.

The real simulation signals 170 generated by the sensor error model unit 140 can be transmitted to the DUT 150 via Bluetooth, WLAN or any other suitable wireless technology or alternatively a wired connection can be provided to send the real simulation signals 170 to the DUT 150. The data transfer from the sensor simulator 120 to the DUT 150 can be realized the same way as the data transfer from the sensor error model unit 140 to the DUT 150.

Both, the high precision GNSS simulator 110 and the sensor simulator 120 provide an input that allows a user to enter trajectory data as input data. The input data includes latitude, longitude, altitude, yaw, pitch and roll.

Further, the test system may optionally comprise a sensor signal processing unit 145 that is configured to process input signals 162, 172 to simulate specific movement patterns. This simulation of specific movement patterns can be performed for the ideal simulated signals 160 as well as for the erroneous signals respectively the real simulation signals 170. An ideal signal provided with a specific movement pattern 163 can be sent directly to the DUT 150 (not shown) or to the input of the sensor error model unit 140. A real simulation signal provided with a specific movement pattern 173 is sent directly to the DUT 150. In other words, the simulated sensor signals, no matter if ideal simulated sensor signals 160 or real simulation signals 170, are fed into the sensor signal processing unit 145 and are converted to simulate specific movements. Such simulated movements may, for example, be the steps of a person walking or running or the typical arm movements of a person holding a phone or any other mobile device. The simulation of movements allows testing of more complex positioning algorithms, and allows also to simulate events that require the DUT to start a specific action.

The test system may further comprise a location server 130 that is capable of communicating, in other words to exchange data, with other units of the test system such as the high precision GNSS simulator 110, the sensor simulator 120, the sensor error model unit 140, the sensor signal processing unit 145, or any other unit within the test system. The location server 130 further establishes a communication link 180 between the test system via the location server 130 and the DUT 150. The communication link 180 provides a bi-directional communication, such as via Long Term Evolution (LTE) signals, and, however, the use of any other suitable signals such as WLAN or Bluetooth signals is also conceivable. The bi-directional communication allows the DUT 150 to send its positioning information to the test system and to request RTK correction data. For instance, for testing V2X communication, which is a communication from a vehicle to other vehicles nearby, it is required that the test system is able to receive data emitted by the DUT. For testing the functionality that a specific event is triggered, for example an E911 call, it is required that the test system is able to receive the appropriate data from the DUT and further to request positioning data from the DUT 150.

Figure 2:
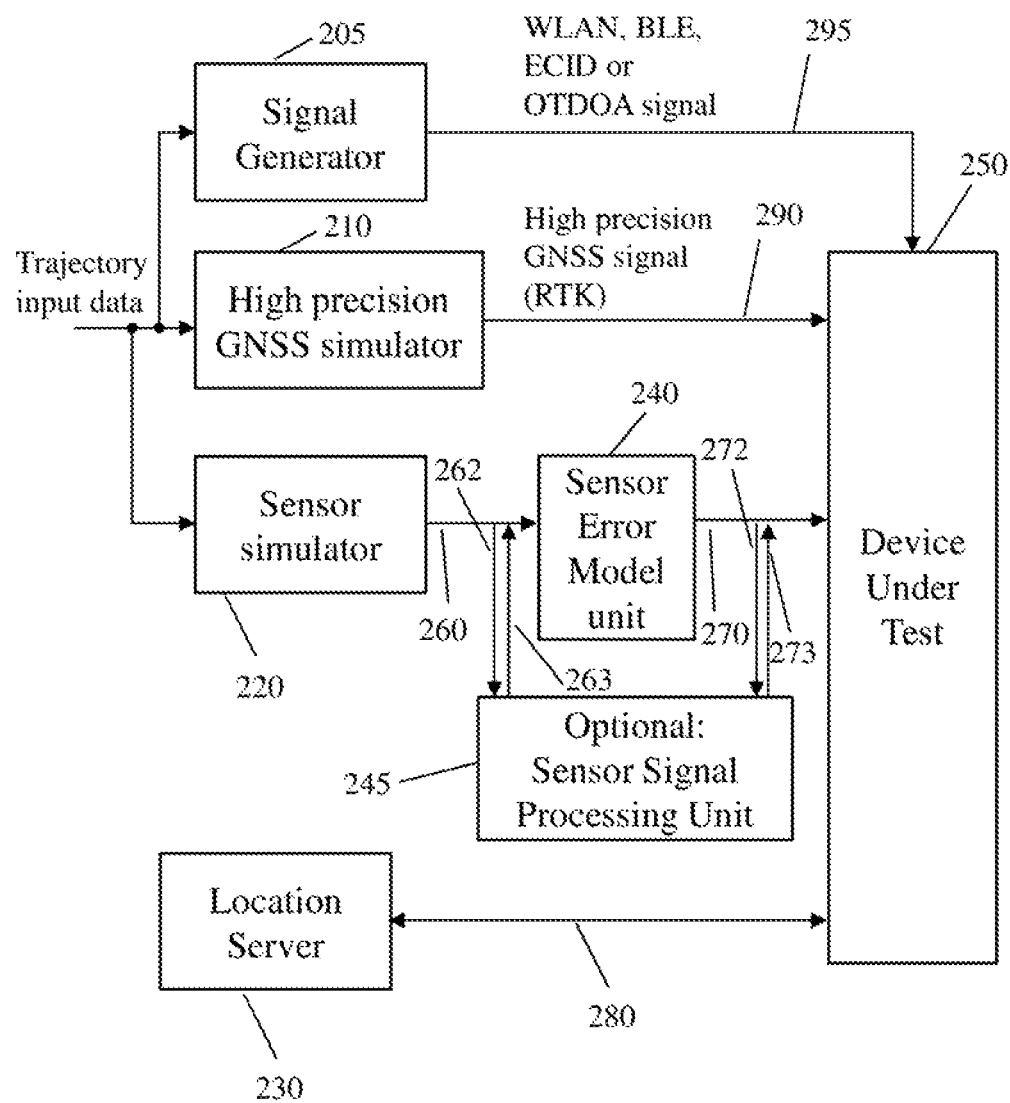
FIG. 2 shows a block diagram of a test system for testing the positioning functionality of a device under test (DUT), including an additional signal generator for expanded testing the positioning functionality of a DUT, according to example embodiments of the present invention.

FIG. 2 shows a block diagram of a test system for testing the positioning functionality of a device under test (DUT) (such as the system of FIG. 1), including an additional signal generator 205 for expanded testing the positioning functionality of a DUT, according to example embodiments of the present invention. Determining the position based on signals other than GNSS signals gets more and more important, especially for indoor navigation. For example, unmanned vehicles within storage locations or factories need to be navigated without having GNSS reception. Thus, testing the functionality of a DUT that is capable of indoor navigation with other signals than GNSS signals gets more and more important. The signal generator 205 is therefore capable of establishing WLAN (Wireless Local Area Network), BLE (Bluetooth Low Energy), ECID (Enhanced Cell ID) or OTDOA (Observed time Difference of Arrival) signals, which can be used by a DUT to calculate its position instead of using GNSS signals. The signals generated by the signal generator 205 may be transmitted in a wireless way to the DUT 250 via an antenna (not shown) incorporated into or connected to the signal generator 205, or it is also conceivable that a cable connection 295 between the signal generator 205 and the DUT 250 is provided to send the signals from the signal generator 205 to the DUT 250.

Figure 3:
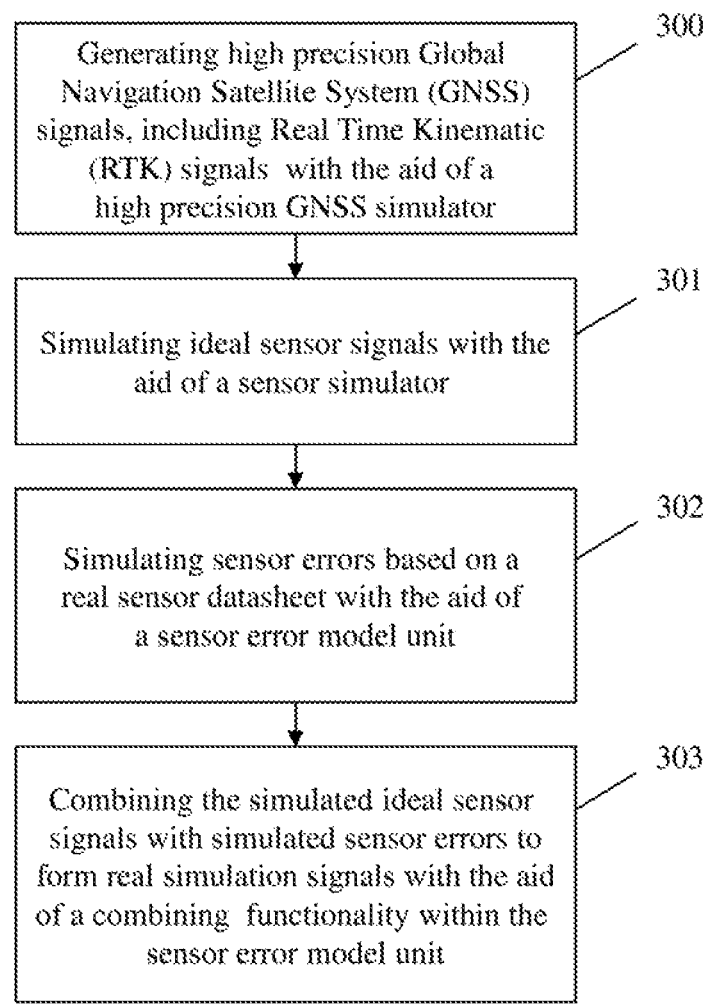
FIG. 3 shows a flow chart of a testing method for performing positioning functionality testing of a device under test (DUT) according to example embodiments of the present invention.

FIG. 3 shows a flow chart of a testing method for performing positioning functionality testing of a device under test (DUT) according to example embodiments of the present invention. In step S300, high precision global navigation satellite system (GNSS) signals, which include real-time kinematic (RTK) signals, are generated using a high precision GNSS simulator 110. In step S301, ideal sensor signals are simulated using a sensor simulator 120. In step S302, sensor errors are simulated based on a real sensor datasheet with the aid of a sensor error model unit 140. In step S303, the simulated ideal sensor signals 160 are combined with the simulated sensor errors to form real simulation signals 170, with the aid of a combining functionality within the sensor error model unit 140.

While various embodiments of the present invention have been described above, it should be understood that they have been presented by way of example only, and not for limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A test system for testing the positioning functionality of a device under test (DUT), comprising:
    a high precision global navigation satellite system (GNSS) simulator configured to simulate GNSS signals which include real-time kinematic (RTK) signals and to provide the GNSS signals to the DUT;
    a sensor simulator configured to simulate ideal sensor signals; and
    a sensor error model unit; and
    wherein the sensor simulator is further configured to provide the ideal sensor signals to the sensor error model unit,
    wherein the sensor error model unit is configured to simulate sensor errors based on the ideal sensor signals and a real sensor datasheet, and to combine the simulated ideal sensor signals with the simulated sensor errors to form real simulation signals, and wherein one or more of the real simulation signals and the ideal sensor signals are provided to the DUT.

2. The test system according to claim 1, wherein the ideal signals are of one or more of an inertial measurement unit (IMU) sensor, a barometer sensor, an odometer sensor and a magnetometer sensor.

3. The test system according to claim 1, wherein the simulated sensor errors include at least package to frame misalignment, inter-axis misalignment, sensitivity error, bias and noise.

4. The test system according to claim 1, wherein one or more of the simulated ideal sensor signals and the real simulation signals are configured to be used by the DUT to perform positioning calculations.

5. The test system according to claim 1, wherein one or more of the simulated ideal sensor signals and the real simulation signals are configured to simulate a specific condition that triggers a certain event to be performed by the DUT.

6. The test system according to claim 1, wherein one or more of the high precision GNSS simulator and the sensor simulator is/are adapted to receive trajectory data as input data.

7. The test system according to claim 6, wherein the input data includes latitude, longitude, altitude, yaw, pitch and roll.

8. The test system according to claim 1, wherein the high precision GNSS simulator is synchronized with the sensor simulator.

9. The test system according to claim 1, wherein the simulated sensor errors include one or more of temperature error and flicker noise.

10. The test system according to claim 1, further comprising:
a communication link between the test system and the DUT configured for requesting and transmitting one or more of positioning information and RTK correction data.

11. The test system according to claim 1, further comprising:
a signal generator configured to establish one of a wireless local area network (WLAN) signal, a Bluetooth low energy (BLE) signal, an enhanced cell ID (ECID) signal and an observed time difference of arrival (OT-DOA) signal, configured to be used by the DUT to calculate its position.

12. The test system according to claim 1, wherein the sensor error model unit is configured to allow a user to modify one or more parameters specified by the real sensor datasheet.

13. The test system according to claim 1, further comprising:
a processor configured to process one or more of the simulated ideal sensor signals and the real simulation signals to simulate movement patterns.

14. A method for performing positioning functionality testing of a device under test (DUT) comprising:
generating high precision global navigation satellite system (GNSS) signals, including real-time kinematic (RTK) signals, using a high precision GNSS simulator, and providing the GNSS signals to the DUT;
simulating ideal sensor signals using a sensor simulator;
providing the ideal sensor signals to a sensor error model unit;
simulating sensor errors based on the ideal sensor signals and a real sensor datasheet using the sensor-error model unit;
combining the simulated ideal sensor signals with the simulated sensor errors to form real simulation signals using the sensor error model unit; and
providing one or more of the real simulation signals and the ideal sensor signals to the DUT.

15. The method according to claim 14, further comprising:
performing positioning calculations, by the DUT, based on received high precision GNSS signals and based on one or more of received simulated ideal sensor signals and received real simulation signals.

16. The method according to claim 14, wherein the ideal signals are of one or more of an inertial measurement unit (IMU) sensor, a barometer sensor, an odometer sensor and a magnetometer sensor.

17. The method according to claim 16, further comprising:
processing one or more of the simulated ideal sensor signals and the real simulation signals to simulate movement patterns.

18. The method according to claim 14, wherein the simulated sensor errors include at least package to frame misalignment, inter-axis misalignment, sensitivity error, bias and noise.

19. The method according to claim 14, wherein the simulated sensor errors include one or more of temperature error and flicker noise.

* * * * *